United States Patent Office 3,562,195
Patented Feb. 9, 1971

3,562,195
FLUORIDE ELASTOMER COMPOSITION
Philip J. Reiner, Woodland Hills, and Orville F. Markles, Jr., Hawthorne, Calif., assignors to North American Rockwell Corporation
No Drawing. Filed Dec. 4, 1967, Ser. No. 687,429
Int. Cl. C08f 29/22, 37/16
U.S. Cl. 260—23.5                                                   10 Claims

ABSTRACT OF THE DISCLOSURE

A novel elastomeric composition of matter wherein said composition comprises a copolymer of vinylidene fluoride and hexafluoropropylene and a terpolymer of ethylene and propylene.

---

The present invention relates to a novel elastomeric composition of matter, and more particularly, the subject invention pertains to an elastomeric composition possessing unobvious properties such as resistance to severely deteriorating chemicals, resistance to high temperatures, excellent tensile strength characteristics and other like desirable properties. Specifically, the instant invention is concerned with an elastomer comprising a fluorovinylidene propylene copolymer and an ethylene propylene terpolymer.

In the commercial, scientific and military fields, rubber substitutes or elastomers are frequently used for many endeavors. For example, elastomeric compositions are used for electrical insulating tapes, for sealing the ends of containers, between metal parts for eliminating vibrations, for gaskets, as piston seals, vacuum hoses, for O-rings, as conduits to convey liquids and gases, and for other like applications.

A critical need exists for acceptable elastomers for the above and other purposes. This need is most critical where the elastomeric substances are subjected to heat and to deleterious and corrosive gases and chemicals that are frequently required in many applications. Often, the present art available elastomers seemingly do not possess the desired characteristic for exposure to these and other adverse conditions.

Accordingly, it is a purpose of the present invention to provide a novel elastomeric composition.

Another purpose of the instant invention is to provide an elastomer having desirable characteristics for application where adverse conditions must be met.

Still another purpose of the subject invention is to provide an elastomer comprising a vinylidene propylene copolymer and an ethylene propylene terpolymer.

Yet another purpose of the invention is to provide a fluoro-vinylidene propylene, ethylene propylene composition that possesses resistance to high temperatures and resistance to chemicals.

Yet a further purpose of the present invention is to provide an elastomeric composition with improved properties that can readily be fabricated into useful products having any size and shape according to the purpose for which it will be subsequently employed.

These and other purposes of the invention will become apparent from a consideration of the accompanying disclosure and the appended claims.

According to the present invention the novel elastomeric composition employed herein for forming useful products can be formulated from the appropriate batch ingredients. The elastomeric composition can be prepared by blending the ingredients comprising a copolymer of vinylidene fluoride hexafluoropropylene with a terpolymer of ethylene propylene, and with cross-linking agents, vulcanizing agents, accelerators and abrasion resistant agents on a rubber type mill and then molding with appropriate temperature, such as 300 to 350° F., and pressure conditions, such as 12 to 30 tons ram pressure, the just formed elastomeric composition into the desired predetermined shaped product.

The batch ingredient copolymer vinylidene fluoride hexafluoropropylene is the commercially available copolymer sold under the registered trademark Viton. Also, vinylidene fluoride hexafluoropropylene type copolymers are generally prepared by art recognized procedures, such as by the copolymerization of vinylidene fluoride and hexafluoropropylene at a temperature up to 100° C. A catalytic system consisting of a mixture of a persulfate and bisulfite can be used, although other redox systems can also be used. The reaction between the two above stated monomers is quick and polymerization generally takes less than twenty minutes. Ammonium perfluoro-octanoate is often used as an emulsifying agent. The formed polymer can be separated from the reaction product by coagulation with sodium chloride or with a mineral acid. The commercially available ethylene propylene terpolymer of the kind used herein can be prepared by using a Ziegler-Natta type catalytic system. Terpolymers of ethylene and propylene with a ratio of three to one are usually prepared with a few percent unsaturated nonconjugated diene units. The concentration of the copolymer and the terpolymer used for the fabrication of the elastomer of the invention is usually about 40 to 80 grams of terpolymer and 20 to 60 grams of copolymer for 100 grams of total polymer material.

The accelerators employed to hasten the vulcanization and speed up the cross-linking process are the art available accelerators such as tetramethylthiuram disulfide, mercaptobenzothiazole, aniline, thiocarbanilide, para-aminodimethyl aniline, and the like. Generally, one or more can be used and the concentration of the accelerator is about 0.5 to 5 grams per 100 grams of blended polymers. Vulcanization accelerators like zinc oxide may also be used in a range of from 1 to 5 grams.

The plasticizers employed as a processing aid for workability during the milling are agents such as oleic acid, stearic acid and the like. Usually, about 1 to about 5 grams of plasticizer are used for every 100 grams of blended polymer. Also, in the present composition, carbon black is added as an abrasion and reinforcing agent and sulfur is added as a vulcanization and curing aid for its cross-linking effects. The amount of carbon black added to the blend is generally about 40 to 60 grams per 100 grams of total polymers. About 1 to 5 grams of sulfur are added for said 100 grams of blended polymer for vulcanization and curing the blended polymer components.

The above ingredients and methods are merely illustrative of the spirit of the invention, and it is to be understood that they are not intended to limit the disclosure, as other techniques may be successfully employed. The following examples are illustrative of the invention and they are not to be considered as limiting the scope of the invention.

EXAMPLE I

To 75 grams of ethylene propylene terpolymer was added 25 grams of a copolymer of vinylidine fluoride and hexafluoropropylene and 50 grams of carbon black and the three ingredients were milled on a rubber mill consisting of two parallel, horizontal rolls set close together at a roll gap of 0.010 inch and revolving in opposite directions for about 5 minutes. The terpolymer of ethylene and propylene was the commercially available Enjay®, purchased from the Enjay Chemical Company, EPT 3509, having a Mooney viscosity at 260° F. of 63, a specific gravity of 0.86, consisting of about 55 percent ethylene, a light amber color and no odor. The copolymer was the commercially available copolymer Viton® A–HV, purchased from E. I. du Pont, having a specific gravity of 1.82, a Mooney viscosity of 180 at 212° F., a white translucent appearance and it is soluble in ketones.

Next, 5 grams of zinc oxide and 1 gram of stearic acid were added to the just milled above-listed polymeric reagents and the mixture was again milled for another 5 minutes. To this milled batch was added 2 grams of sulfur, 1.5 grams of tetramethyl-thiuram disulfide, and 0.5 gram of mercaptobenzothiazole and the batch was again milled for 5 minutes. The copolymer terpolymer mixture containing all the agents were mixed for a time sufficient to produce a thoroughly blended homogeneous mixture. The mixture was blended on the mill for about 5 to 20 minutes and the temperature was about 150° F. to 180° F. The milled product was then removed in sheet form, cut, and placed onto templates of a predetermined design, usually O-rings. Next, the templates were heated to about 320° F., for 30 minutes, and at a pressure of about 20 to 30 tons per square inch of platen pressure to produce the final cured, cross-linked elastomeric composition. The novel elastomeric composition produced by the process just described consists essentially of 75 parts of terpolymer and 25 parts of copolymer per 100 grams of total polymer, 50 grams of carbon black, 1 gram of stearic acid, 2.0 grams of sulfur, 1.5 grams of tetramethyl thiuram disulfide, 0.5 gram of mercaptobenzothiazole and 5 grams of zinc oxide.

EXAMPLE II

Following the procedure set forth in Example I, another batch was blended with a ratio of 1 part terpolymer to 1 part copolymer. The roll blended mixture was prepared by milling 50 grams of ethylene propylene terpolymer with 50 grams of vinylidene fluoride hexafluoropropylene copolymer, 50 grams of carbon black, 5 grams of zinc oxide, 1 gram of stearic acid, 2 grams of sulfur, 1.5 grams of tetramethyl thiuram disulfide and 0.5 gram of mercaptobenzothiazole.

In Table I, immediately below the physical properties of the terpolymer copolymer composition prepared according to the blending procedure of Example I are compared with the physical properties of the terpolymer and with the physical properties of the copolymer. In the table, the phrase "original properties" indicates the properties of the respective blends after receiving an appropriate press cure. The cure for the terpolymer was 30 minutes at 320° F. and the cure for the copolymer was 30 minutes at 300° F. The cure for the blend of copolymer and terpolymer was also at 30 minutes and at 320° F. The post cure for the terpolymer was 4 hours at 300° F., for the copolymer the post cure was a step cure to 400° F. and then held at 400° F. for 16 hours. The post cure for the blend of the terpolymer and copolymer was for 4 hours at 300° F. Also in the table, HMDA–C means hexamethylene diamine carbamate, TMTDS means tetramethyl thiuram disulfide and MBT is an abbreviation for mercaptobenzothiazole. The expression TR 10/70 indicates the low temperature performance of the respective elastomers, and, when used herein TR means temperature-retraction and the numerals 10/70 mean the temperatures at which the elastomer has retracted 10 percent and 70 percent respectively from its elongated position to its original position.

The apparently unobvious properties for the novel composition of the present invention are seen to be set forth in the above table. Other desirable properties of the composition are its good compatibility with unsymmetrical dimethyl hydrazine and inhibited red fuming nitric acid. The ethylene propylene terpolymer generally possesses poor compatibility with fuming nitric acid while possessing compatibility with the above mentioned hydrazine. The copolymer vinylidene fluoride hexafluoropropylene is compatible with fuming red nitric acid but seemingly lacks good compatibility with the hydrazine. In contrast, the novel elastomeric composition comprising the terpolymer and copolymer possesses good chemical resistance or compatibility against both the nitric acid and the hydrazine.

As is evident from the above examples, data and discussions, the novel elastomeric composition of the present invention exhibits excellent properties for fabrication into many useful products like O-rings, compression head seals, liners for vessels containing chemicals and the like; and that the instant invention represents a significant achievement to elastomeric technology.

Obviously, many modifications and variations of the instant invention are possible in the light of the above teachings, and it is, therefore, to be understood that within the scope of the claims, the invention may be practiced otherwise as specifically described.

We claim:
1. An elastomeric polymer composition comprising a blend of 20 to 60 grams of a copolymer of vinylidene fluoride and hexafluoropropylene and 40 to 80 grams of an

TABLE I.—COMPARISON OF PROPERTIES OF TERPOLYMER, COPOLYMER AND BLEND THEREOF

| | Ethylene propylene terpolymer | | Vinylidene fluoride hexafluoropropylene copolymer | | Ethylene propylene terpolymer and vinylidene fluoride hexafluoropropylene copolymer | |
|---|---|---|---|---|---|---|
| | Ingredients | Parts/100 gms. | Ingredients | Parts/100 gms. | Ingredients | Parts/100 gms. |
| | Terpolymer | 100 | Copolymer | 100 | Terpolymer | 75 |
| | Carbon black | 50 | Carbon black | 50 | Copolymer | 25 |
| | Stearic acid | 1 | Magnesium oxide | 15 | Carbon black | 50 |
| | Sulfur | 2 | HMDA-C | 1.5 | Zinc oxide | 1 |
| | TMTDS | 1.5 | | | Stearic acid | 1 |
| | MBT | 0.5 | | | Sulfur | 2 |
| | | | | | TMTDS | 1.5 |
| | | | | | MBT | 0.5 |
| Physical Properties Measured after Press Cure* | | | | | | |
| Hardness Shore A | 72 | | 72 | | 76 | |
| Modulus 100 percent elongation | 625 | | 650 | | 850 | |
| Ultimate elongation percent | 245 | | 220 | | 260 | |
| Tensile strength, p.s.i. | 2,125 | | 2,725 | | 2,900 | |
| TR 10/70 | −49/−4 | | +6/+49 | | −30/+3 | |
| Physical Properties after Post Cure* | | | | | | |
| Hardness Shore A | 73 | | 77 | | 76 | |
| Modulus 100 percent elongation | 780 | | 760 | | 1,105 | |
| Ultimate elongation percent | 220 | | 220 | | 225 | |
| Tensile strength, p.s.i. | 2,360 | | 2,600 | | 3,125 | |

*See discussion, cols. 3 and 4, on press cure and post cure.

ethylene/propylene/non-conjugated diene terpolymer per 100 grams of total copolymer and terpolymer.

2. An elastomeric composition according to claim 1 wherein said elastomeric composition contains 25 to 50 grams of a copolymer of vinylidene fluoride and hexafluoropropylene and 50 to 75 grams of an ethylene/propylene/non-conjugated diene terpolymer.

3. An elastomeric composition according to claim 1 wherein said elastomeric composition further contains a reinforcing agent, a plasticizer, a curing agent and an accelerator.

4. An elastomeric composition according to claim 3 wherein said accelerator is a member selected from the group consisting of tetramethylthiuram disulfide and mercaptobenzothiazole, zinc oxide and mixtures thereof.

5. An elastomeric composition according to claim 3 wherein said plasticizer is stearic acid.

6. An elastomeric composition according to claim 3 wherein said reinforcing agent is carbon black.

7. An elastomeric composition according to claim 3 wherein sad curing agent is sulfur.

8. An elastomeric composition according to claim 3 wherein said elastomeric composition contains 25 to 50 grams of a copolymer of vinylidene fluoride and hexafluoropropylene, 50 to 75 grams of an ethylene/propylene/non-conjugated diene terpolymer, 40 to 60 grams of carbon black, 1 to 5 grams of zinc oxide, 1 to 5 grams of stearic acid, 1 to 5 grams of sulfur, 0.5 to 5 grams of tetramethyl thiuram disulfide, 1 to 5 grams of sulfur and 0.5 to 5 grams of mercaptobenzothiazole.

9. An elastomeric composition according to claim 1 wherein said ethylene/propylene/non-conjugated diene terpolymer contains ethylene and propylene in a ratio of three to one.

10. An elastomeric composition according to claim 3 wherein the elastomeric composition is in a cured condition.

References Cited
UNITED STATES PATENTS

| | | | |
|---|---|---|---|
| 3,443,619 | 5/1969 | Kindle | 152—330 |
| 3,125,547 | 5/1964 | Blatz | 260—897 |
| 2,951,832 | 9/1960 | Moran | 260—875 |

MURRAY TILLMAN, Primary Examiner

C. J. SECCURO, Assistant Examiner

U.S. Cl. X.R.

260—23, 41, 79.5, 897